April 18, 1950 W. B. LOCKE ET AL 2,504,853
AUTOMATIC DRILLING AND TAPPING UNIT
Filed Feb. 18, 1946 6 Sheets-Sheet 3
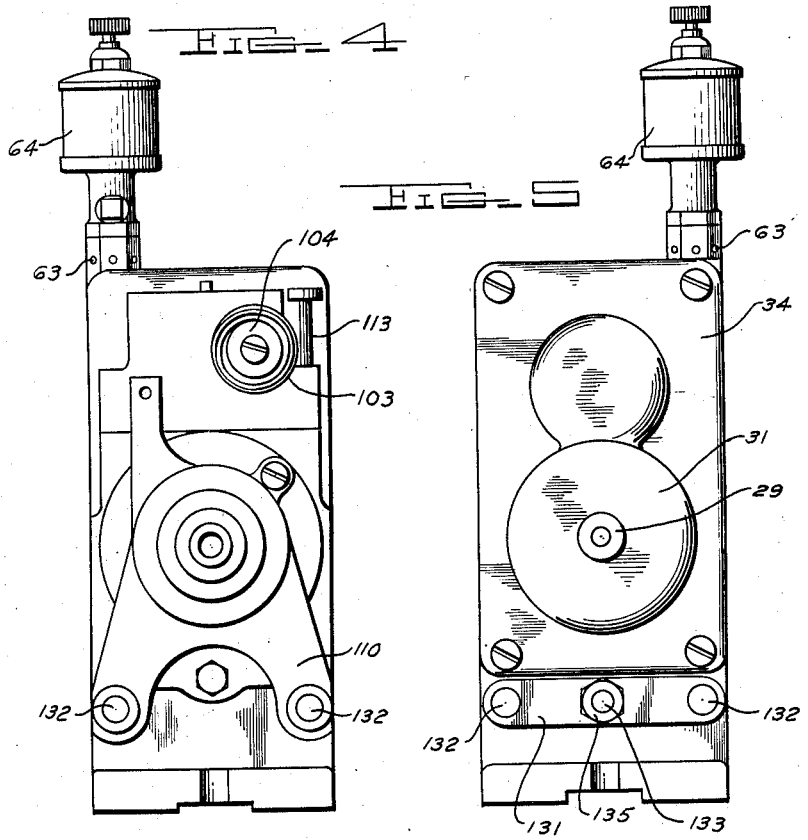
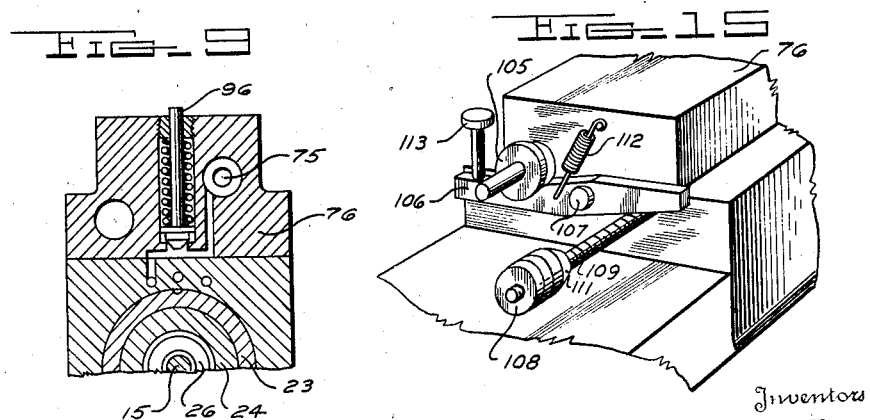
Inventors
WILLIAM B. LOCKE
PERCY E. FRASER April 18, 1950     W. B. LOCKE ET AL     2,504,853
AUTOMATIC DRILLING AND TAPPING UNIT
Filed Feb. 18, 1946     6 Sheets-Sheet 4
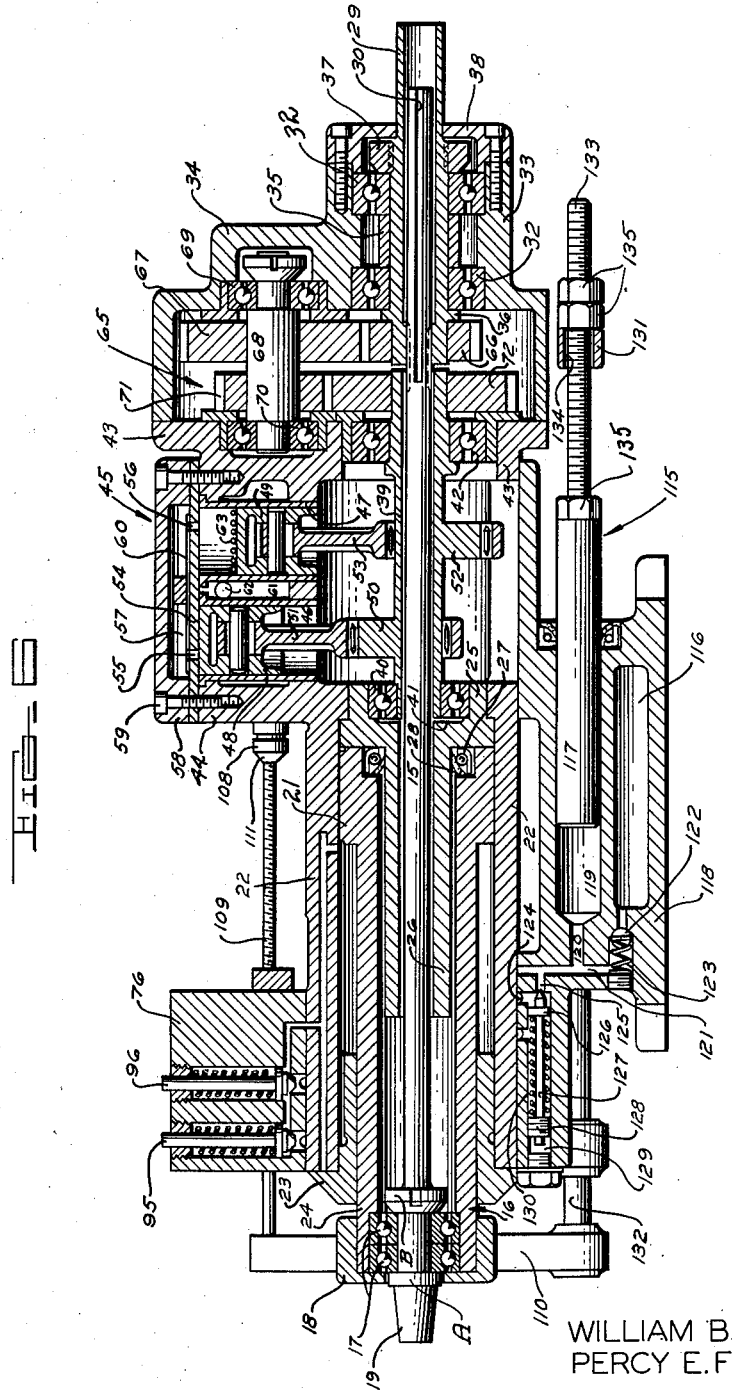
Inventors
WILLIAM B. LOCKE
PERCY E. FRASER
Attorney

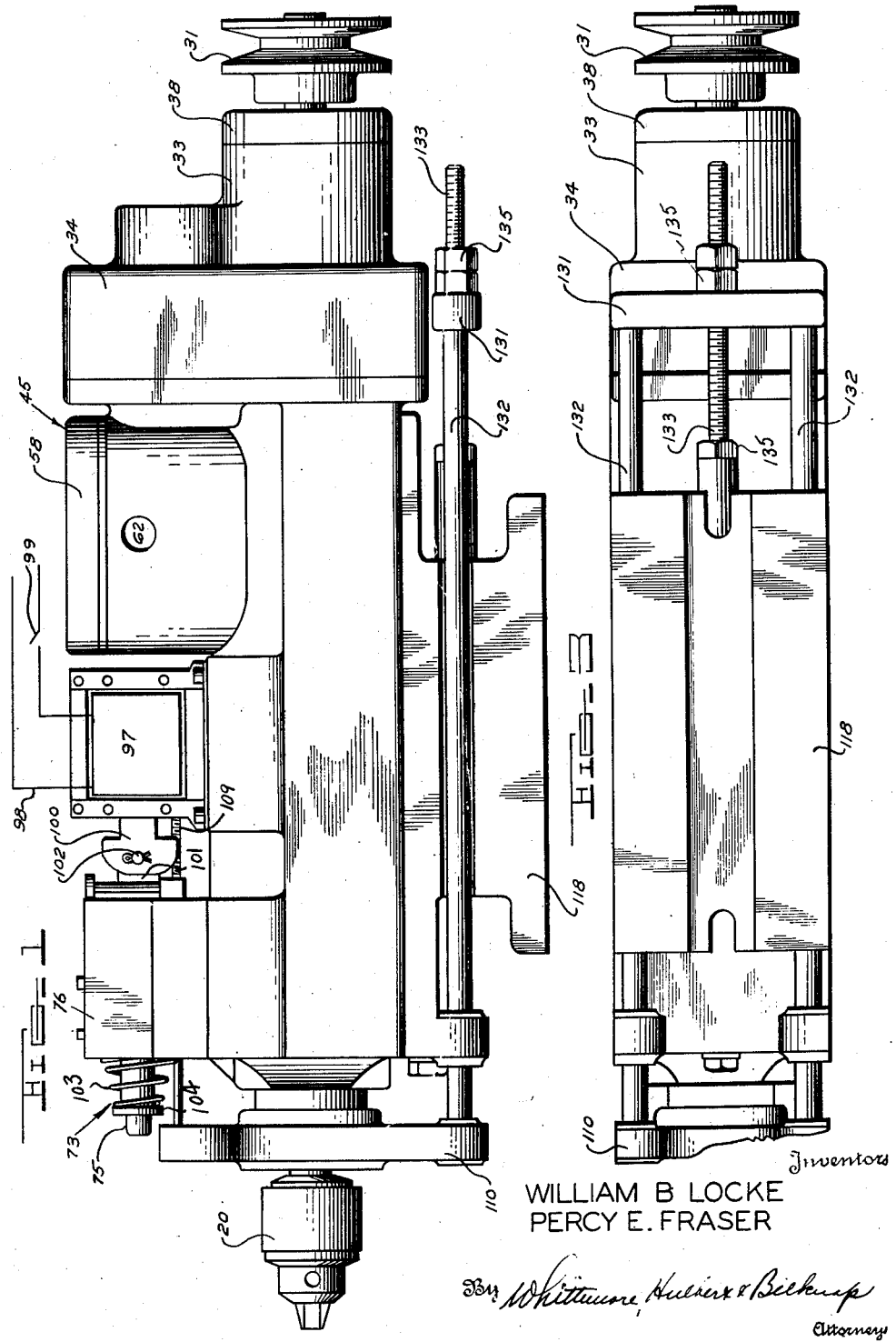

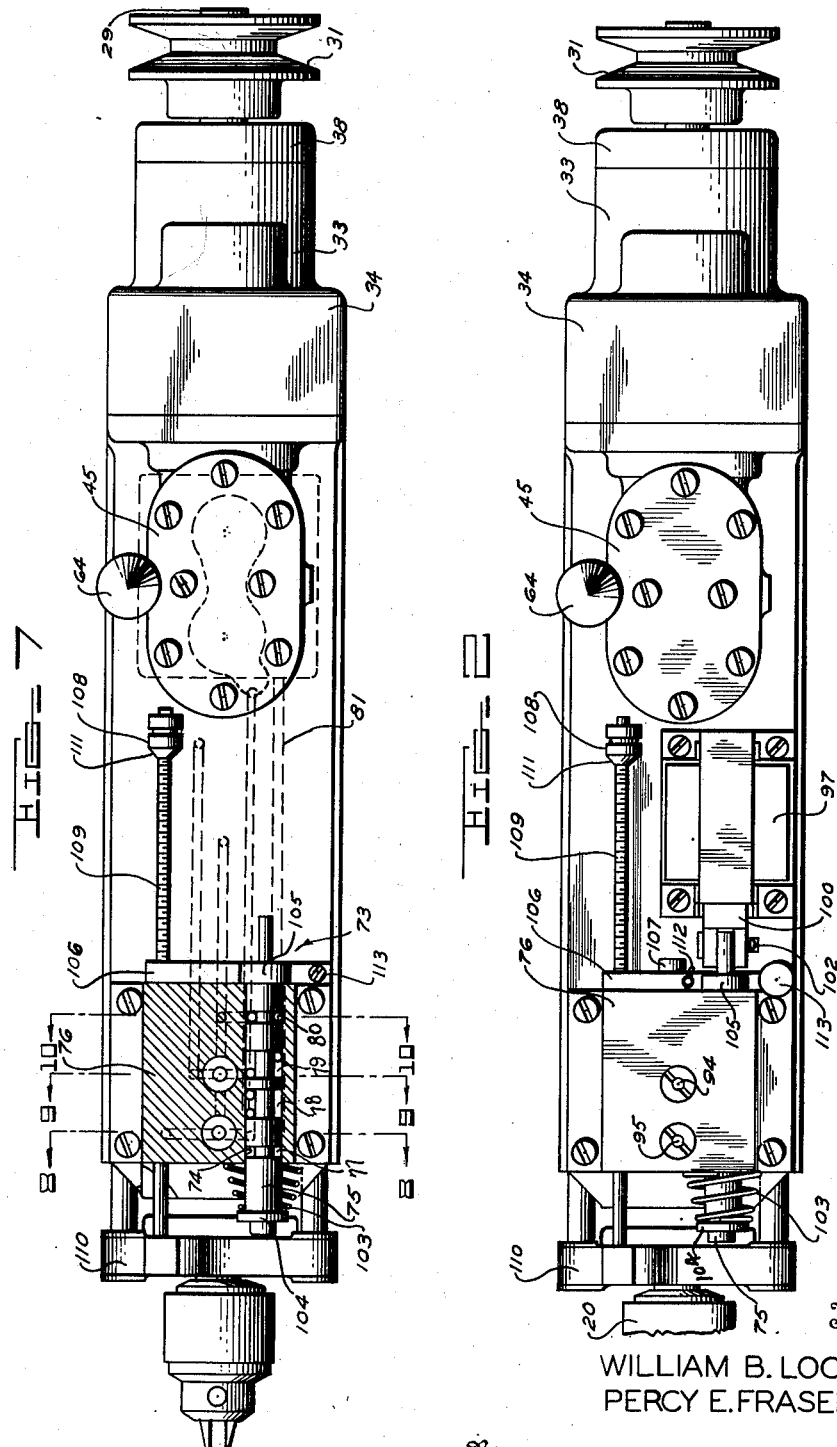

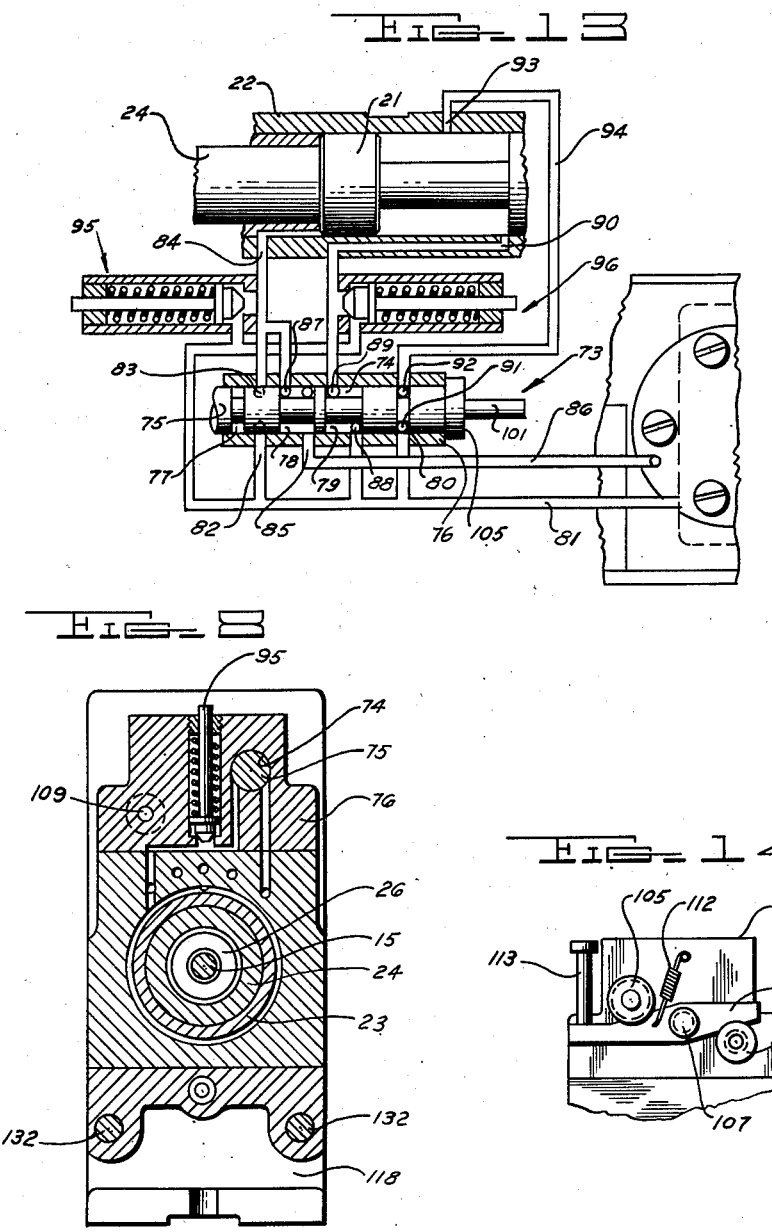

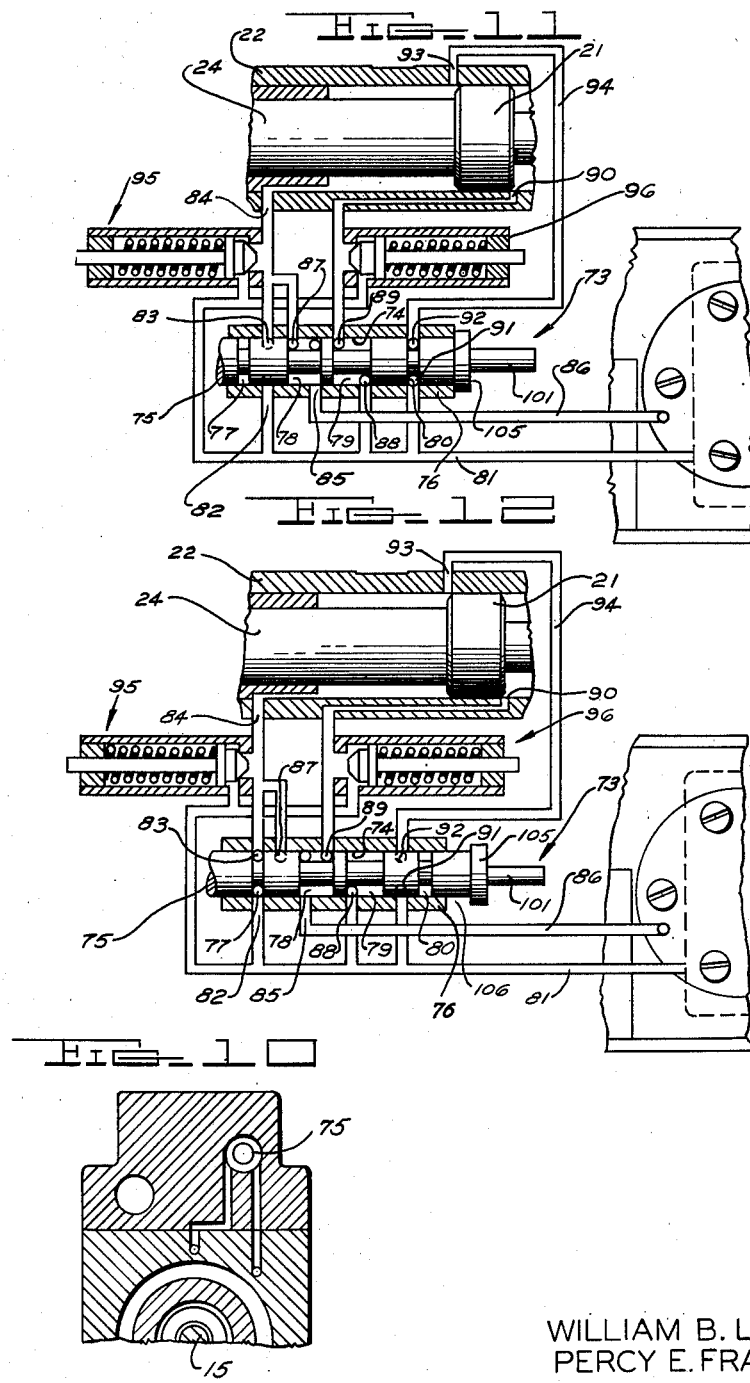

Patented Apr. 18, 1950

2,504,853

UNITED STATES PATENT OFFICE 2,504,853

AUTOMATIC DRILLING AND TAPPING UNIT

William B. Locke, Highland Park, and Percy E. Fraser, Detroit, Mich.; said Fraser assignor to said Locke Application February 18, 1946, Serial No. 648,273

5 Claims. (Cl. 77—32)

This invention relates generally to machine tools and refers more particularly to equipment particularly adapted for drilling or tapping operations.

One of the objects of this invention is to provide an improved completely automatic unit composed of a relatively few simple parts capable of being inexpensively manufactured, assembled and installed.

Another object of this invention is to provide a machine having means for automatically feeding the tool into the work at a rate depending on the degree of hardness of the work being operated upon or on the resistance offered the tool by the work. Thus, the maximum rate of feed for the particular work being fashioned is automatically obtained without consideration on the part of the operator and this is important because it not only assures obtaining maximum production but, in addition, reduces tool breakage and work spoilage.

Still another object of this invention is to provide a machine equipped with pneumatic tool feeding means characterized in that practically no resistance is offered to movement of the tool into engagement with the work and, as a result, the tool may be quickly moved to its operative position relative to the work.

A further object of this invention is to provide a machine of the above general type having means for retarding the rate of feed of the tool throughout either its complete operative stroke or throughout only a portion of the final travel of the tool. Thus, sudden acceleration of the tool after it passes through the work is overcome and smoother performance is obtained.

A still further object of this invention is to provide a machine having a prime mover for rotating the tool and having pneumatic feeding means for the tool supplied with fluid under pressure by a compressor which in turn is operated by the prime mover.

Another feature of this invention is to provide a machine of the above type having provision for bypassing the fluid under pressure from the discharge side of the compressor to the exhaust when the machine is in an idle or neutral position. This arrangement enables discontinuing the operation of the machine without stopping or disconnecting the prime mover.

Still another object of this invention is to mix lubricant with the air as the latter is admitted to the compressor and to discharge or exhaust the air into the machine casing after it has served its purpose. As a result, the lubricant suspended in the air assists in lubricating the working parts of the machine.

The foregoing as well as other objects will be made more apparent as this description proceeds, especially when considered in connection with the accompanying drawings, wherein:

Figure 1 is a side elevational view of a machine tool constructed in accordance with this invention;

Figure 2 is a plan view of the construction shown in Figure 1;

Figure 3 is a bottom elevational view of the construction shown in Figure 1;

Figure 4 is a front elevational view of the machine shown in Figure 1;

Figure 5 is a rear elevational view of the machine shown in Figure 1;

Figure 6 is a longitudinal vertical sectional view through the machine shown in Figure 1 of the drawings;

Figure 7 is a plan view, partly in section, of the construction shown in Figure 6;

Figures 8, 9 and 10 are respectively cross sectional views taken on the lines 8—8, 9—9 and 10—10 of Figure 7;

Figures 11 to 13 inclusive are semi-diagrammatic views showing the parts in different positions;

Figure 14 is a fragmentary elevational view of a part of the structure shown in Figure 1;

Figure 15 is a fragmentary prospective view of the construction shown in Figure 14.

The machine tool shown in the several figures of the drawings comprises a rotatable spindle 15 extending axially through a tubular piston 16 and journalled at the front end in ball bearings 17 suitably anchored in the front end of the piston by a cap 18. The front end 19 of the spindle projects through a central opening in the cap and is formed with an enlargement A at the front side of the bearings which cooperates with a nut B on the spindle at the rear side of the bearings to secure the spindle to the piston. It will also be noted that the front end of the spindle is formed with a tapered surface 19 adapted to secure a suitable tool holding chuck 20 to the spindle.

The piston 16 has an enlarged cylindrical head portion 21 at the rear end slidably supported in a cylinder 22 and a sleeve 23 is fixed in the outer end of the cylinder for slidably supporting the reduced portion 24 of the piston. The rear end of the cylinder 22 is closed by a fixture 25 having a bore for receiving the spindle 15 and having a forwardly projecting tubular portion 26 extending into the tubular piston 16. A seal 27 is secured in an annular recess 28 formed by counterboring the rear end of the tubular piston and slidably engages the projecting tubular portion 26 on the fixture to prevent the escape of fluid through the piston.

The rear end of the spindle 15 telescopically engages in a tubular drive shaft 29 and is keyed to the latter by a plurality of splines 30. A drive pulley 31 is fixed to the rear end of the drive shaft 29 and is adapted for connection to a suitable prime mover such, for example, as an electric motor, not shown. The drive shaft 29 is journalled in a pair of ball bearings 32 spaced from each other axially of the drive shaft and secured in the hub 33 of a gear housing 34. A tubular spacer 35 is sleeved on the drive shaft 29 between the bearings 32 and the front bearing abuts a shoulder 36 on the drive shaft 29. A nut 37 is threaded on the drive shaft 29 and abuts the rear bearing 32 for holding both bearings as well as the spacer 35 in assembled relationship. A cap 38 is detachably secured to the rear wall of the hub for closing the latter and a central opening is formed in the cap for receiving the shaft 29.

A crank shaft 39 is rotatably supported in concentric relation to the spindle at the front end of the drive shaft 29 and a ball bearing 40 is anchored in a recess 41 formed in the rear end of the fixture 25 for rotatably supporting the front end of the crank shaft. The rear end of the crank shaft 39 is journalled in a ball bearing 42 suitably anchored in a bore formed in the front wall 43 of the gear housing 34. The wall 43 cooperates with a wall 44 at the rear end of the cylinder 22 to form a housing for a compressor 45. The compressor 45 comprises two juxtapositioned cylinders 46 and 47, respectively, slidably supporting a pair of pistons 48 and 49. The piston 48 is connected to a crank 50 on the shaft 39 by means of a connecting rod 51 and the piston 49 is connected to a crank 52 on the shaft 39 by means of a rod 53. The cranks are arranged 180° out of phase, so that while one piston is moved upwardly on its compression stroke, the other piston is moved downwardly on its suction stroke.

The upper ends of the cylinders are closed by a plate 54 having a pair of restricted ports 55 and 56 respectively establishing communcation between the cylinders and a chamber 57. The chamber 57 is formed by a cap 58 secured to the top of the compressor casing by studs 59. The flow of air through the ports into the chamber 57 is controlled by a flat spring metal valve 60 secured intermediate its ends against the top of the plate 54 and having the opposite ends respectively extending in overlapping relation to the ports 55 and 56.

Air is supplied to a chamber 61 positioned between the cylinders through an inlet port 62 and is admitted to the cylinders through an annular series of ports 63 formed in each cylinder intermediate the ends thereof. As shown in Figure 5 of the drawings, air is admitted to the intake port 62 through a series of ports 63' and lubricant is also supplied to the air intake by a cup 64. The lubricant mixes with the air and is employed to lubricate parts of the machine, as will be more fully hereinafter described.

The crank shaft 39 is rotated by the drive shaft 29 through reduction gearing 65. The gearing 65 comprises a relatively small gear 66 fixed on the front end of the drive shaft 29 and arranged in constant mesh with a relatively larger gear 67 secured to a counter shaft 68. The rear end of the counter shaft is journalled in a ball bearing 69 anchored in the rear wall of the gear housing 34 and the front end of the counter shaft 68 is journalled in a ball bearing 70 anchored in a suitable recess formed in the wall 43. A small gear 71 is secured to the counter shaft 68 and is arranged in constant mesh with a relatively larger gear 72 secured to the rear end of the crank shaft 39. As a result, the crank shaft 39 is rotated by the drive shaft 29 at a speed considerably less than the speed of rotation of the spindle.

With the above arrangement it will be noted that as the pistons alternately move downwardly in their respective cylinders, the ports 63 are opened and air is introduced into one or the other of the cylinders from the chamber 61. On the other hand, when the pistons alternately move upwardly in the cylinders, the ports 63 are closed by the pistons and the air previously introduced into the cylinders is compressed. When the air pressure overcomes the force of the spring metal valve 60, the latter is opened and air under pressure flows through the ports in the plate 54 into the chamber 57.

It follows from the foregoing description that as the crank shaft 29 is rotated by the drive shaft 29, the pistons alternately operate to supply air under pressure to the chamber 57. By referring to Figures 7 and 11 to 13 inclusive it will be noted that the chamber 57 is connected to the cylinder 22 through the medium of a valve 73 having a chamber 74 and having a valve member 75 slidably mounted in the chamber. The valve chamber 75 is formed in a block 76 and the latter is secured to the top of the cylinder adjacent the forward end of the cylinder. The valve member 75 is formed with a plurality of axially spaced annular grooves indicated in the several figures of the drawings by the reference characters 77, 78, 79 and 80. The valve member 75 is movable in the chamber 74 to alternately connect the cylinder 22 at opposite sides of the piston head 21 to the compressor chamber 57 and to an exhaust passage 81. In detail, the valve chamber has a port 82 which communicates with the exhaust passage 81 and has a diametrically opposed port 83 which communicates with the cylinder 22 at the front side of the piston head 21 through a port 84. A second port 85 is formed in the valve chamber in communication with the compressor chamber 57 through the medium of a passage 86 and also communicates with an opposed port 87 having a fluid connection with the port 84. A third port 88 is formed in the valve chamber in communication with the exhaust passage 81 and an opposed port 89 in the valve chamber communicates with the cylinder 22 at the rear side of the piston head 21 through a port 90. A fourth port 91 in the valve chamber 74 communicates with the exhaust passage 81 and is adapted for connection with an opposed port 92. The port 92 communicates with a bypass 94 and the latter is connected to a port 93 formed in the cylinder 22 in a position to be opened or uncovered by the piston head 21 when the latter is in its retracted position in the cylinder.

The valve 73 is shown in its neutral position in Figure 11 of the drawings, and it will be noted from this illustration that the port 85 is connected to the port 87 by the annular groove 78. As a result, the port 84 is connected to the compressor chamber 57 and air under pressure is admitted to the cylinder 22 in advance of the piston head 21. It will also be noted from Figure 11 of the drawings that the port 88 is connected to the port 89 by the annular groove 79. Since the port 90 in the cylinder at the rear end of the piston 21 is connected to the port 89, it follows that the rear end of the cylinder is connected to the exhaust passage 81. It will further be noted from Figure 11 of the drawings that the port 91 is connected to the port 92 through the annular groove 80. As previously stated, the port 93 is located in the cylinder in a position to connect the portion of the cylinder in advance of the piston head 21 to the bypass 94 when the piston is in its retracted position. It follows from the above that air under pressure supplied to the portion of the cylinder in advance of the piston head through the port 84 is bypassed to the exhaust passage 81 through the passage 94. Thus, when the valve 73 is in its neutral position shown in Figure 11 of the drawings, the spindle 15 is retained in its retracted position, even though the compressor 45 is in operation.

Figure 12 of the drawings shows the valve 73 in its operative position to effect a feeding stroke of the spindle 15 and the tool (not shown) connected to the spindle. In the above position of the valve 73, the port 82 is connected to the port 83 by the annular groove 77 and, accordingly, the port 84 in the cylinder at the front side of the piston 21 is connected to the exhaust 81. The port 85 is connected to the port 89 by the annular groove 78 with the result that the port 90 in the cylinder at the rear end of the piston head 21 is connected to the air pressure supply line 86, or in other words, is connected to the compressor chamber 57. As a result, the piston 21 is moved in a forward direction and the spindle 15 is correspondingly moved by the piston relative to the drive shaft 29. Although the spindle is advanced by the piston relative to the drive shaft 29, nevertheless, the latter continues rotation of the spindle, so that as the tool carried by the spindle engages the work, it performs the desired cutting operation. It is pointed out at this time that no pressure is exerted on the front side of the piston head as it is advanced in the cylinder and, accordingly, the minimum resistance is offered to movement of the spindle in a direction to engage the tool with the work.

When the valve 73 is in the position thereof shown in Figure 13 of the drawings, the port 85 is connected to the port 87 by the annular groove 78, so that air under pressure from the supply line 86 or from the compressor is admitted through the port 84 into the cylinder 22 at the front side of the piston head 21. Also, the port 88 is connected to the port 89 through the annular groove 79 with the result that the port 90 at the rear end of the cylinder is connected to the exhaust passage 81. As a result, the piston 24, together with the spindle 15 and tool carried thereby, is retracted by the air under pressure. When the piston is in its rearwardmost position in the cylinder 22, the port 93 assumes a position in advance of the piston head 21 where it communicates with the port 84, as shown in Figure 11 of the drawings. Inasmuch as the port 91 is connected to the port 92 by the annular groove 80 in the above position of the valve, the bypass 94 is opened to the exhaust passage 81. Thus, the piston and, accordingly, the spindle is retained in its inoperative position until the valve 73 is again moved to the position shown in Figure 12 of the drawings.

Provision is made herein for controlling the pressures on both the feed and retracting strokes of the piston. This is accomplished by providing a pair of pressure relief valves 95 and 96. The pressure relief valve 95 is connected in the air passage between the ports 83 and 84, so as to relieve excessive pressure on the return stroke of the piston. On the other hand, the pressure relief valve 96 is connected between the ports 89 and 90 in order to prevent excessive pressures when the piston is advanced in the cylinder 22.

As illustrated in Figures 1 and 2, the valve member 75 is moved to the position thereof shown in Figure 12 of the drawings by a solenoid 97 connected in an electric circuit 98 with a suitable switch 99. The armature 100 of the solenoid is connected to the rear end 101 of the valve member 75 by means of a pin 102. The valve member 75 is moved to the position shown in Figure 13 of the drawings by a coil spring 103 surrounding the front end of the valve member. One end of the spring seats against the block 76 and the opposite end of the spring seats against an enlargement 104 formed on the front end of the valve member. A similar enlargement 105 is formed on the valve member adjacent the rear end of the latter for engagement with the adjacent side of the block 76 to limit the extent of forward movement of the valve member by the spring 103.

Inasmuch as the switch 99 is only momentarily closed to energize the coil of the solenoid 97, it follows that some provision must be made for latching the valve member in the position shown in Figure 12 of the drawings. This latch is shown in Figures 14 and 15 of the drawings and comprises an arm 106 pivoted intermediate the ends to the rear face of the block 76 by means of a pin 107. The upper portion of the arm at one side of the pivot 107 is adapted to engage in the space provided between the enlargement 105 and the block 76 when the valve is in its operative position shown in Figure 12 of the drawings. Thus, the valve member is held in its open position against the action of the spring 103.

The latch is automatically released to enable closing of the valve by the spring 103 in response to movement of the spindle 15 throughout the final portion of its feeding stroke. For accomplishing this result, a nut 108 is threaded or adjustably supported on the rear end of a rod 109 and the rod extends forwardly through a suitable opening formed in the block 76 beneath the latch arm 106 at the side of the pivot 107 opposite the side at which the valve member is located. The forward end of the rod 109 is connected to a yoke 110 which is secured to the cap 18 at the front end of the piston so as to move as a unit with the piston and spindle 15. The nut 108 is adjustably supported on the rod 109 to engage the underside of the latch arm 106 during the final portion of the feeding stroke of the spindle and the nut has a conical surface 111, which acts as a cam to swing the arm 106 against the action of the spring 112 in a direction to disengage the latch arm from the valve member 75. As soon as the latch arm is released from the valve member, the latter is moved to the position shown in Figure 13 by the spring 103 and the spindle is retracted in the manner clearly described above. If desired, provision may be made in the form of a projection 113 for manually tripping the latch arm 106.

Under some conditions, it may be advantageous to retard the rate of feeding of the spindle just before the tool on the spindle breaks through the work being operated upon. This may be accomplished by providing a dash pot 115, comprising a reservoir 116 for a hydraulic fluid medium and a reciprocable plunger 117. The reservoir 116 may be formed in the base portion 118 of the machine, and the cylinder 119 for the plunger 117 may also be formed in the base portion 118. The front end of the cylinder 119 communicates with a restricted horizontal passage 120 and the latter, in turn, is connected to a vertical passage 121 intermediate the ends of the latter. The lower end of the vertical passage communicates with the reservoir 116 through a check valve 122 which is normally closed by a spring 123. The upper end of the vertical passage 121 communicates with lubricant discharge passages 124 through a restricted port 125. The restricted port 125 is normally closed by a valve 126 having a stem 127 slidably engaging a nut 128 which is threadably supported in a bore 129 formed in the base portion 118. A coil spring 130 surrounds the stem 127 with the rear end engaging an enlargement on the valve and with the front end abutting the nut 128. Thus, the tension of the spring, and accordingly, the pressure at which the valve opens the port 125, may be regulated by the adjusting nut 128.

The plunger 115 is operated by a pull bar 131 positioned at the rear end of the plunger and has its opposite ends connected by a pair of rods 132 to the yoke 110. Thus, movement of the yoke 110 by the piston 24 or spindle 15 effects a corresponding movement of the pull bar 131. The rear end of the plunger 115 has a lost motion connection with the pull bar comprising a threaded rod 133 extending rearwardly from the plunger and projecting freely through an opening 134 formed in the pull bar intermediate the rods 132. Adjusting nuts 135 are threaded on the rod 133 at opposite sides of the pull bar 131 and cooperate with one another to form spaced shoulders for alternate engagement with the pull bar upon movement of the latter in opposite directions. By adjusting the nuts 135, it is possible to retard the rate of advancement of the spindle 15 throughout the entire length of the feeding stroke or throughout only the final portion of the feeding stroke.

Although it is believed that the operation of the machine is apparent from the foregoing description, nevertheless, a recapitulation of the operation will be briefly noted below for the purpose of convenience. Assuming that the several parts of the machine are in the relative positions shown in Figures 1 and 11 of the drawings, and also assuming that the drive shaft 29 is being rotated by the prime mover (not shown), it will be noted that air under pressure from the pressure chamber 57 of the compressor is being bypassed through the valve 73 and cylinder 22 to the exhaust passage 81. As mentioned above, the air is mixed with lubricant and, instead of exhausting the air directly into the atmosphere, it is discharged by the passage 81 into the casing of the machine, so that the lubricant is sprayed on the parts requiring lubrication.

Assuming now that it is desired to start feeding the tool carrying spindle, the operator merely closes the switch 99 in the circuit 98. As a result the contactor coil of the solenoid is energized and the valve member 75 is pulled in a rearward direction against the action of the spring 103 to the position shown in Figure 12 of the drawings. As the valve member approaches the above open position, the latch arm 106 is moved by the spring 112 into the space between the head 105 at the rear end of the valve member and the adjacent surface of the valve block 76. Thus the valve member 75 is held in its open position even though the switch 99 is immediately opened to deenergize the solenoid contactor coil. The piston 16, together with the rotating spindle 15, is advanced into engagement with the work and the tool carried by the spindle chuck 20 is fed into the work. The rate of feed will depend largely on the characteristics of the material being fashioned. In actual practice, the rate of feed is proportionate to the degree of hardness of the material so that maximum production is obtainable without damaging the tool.

In cases where a drill or equivalent tool is mounted in the chuck 20, it is desired to greatly retard the rate of feed at an interval just before the tool breaks through the work. This is accomplished by so positioning the adjusting nuts 135 on the threaded rod 133 that as the spindle approaches the end of its feeding stroke, the dash pot plunger 117 is advanced in the cylinder 119 toward the restricted outlet 120. It will, of course, be understood that the cylinder 119 is filled with a hydraulic fluid, so that the degree of retardation depends on the rate of escape of fluid through the outlet 120. This rate may be readily varied to suit existing conditions by adjusting the tension of the spring 130 acting on the needle valve 126.

Also during the final portion of the feeding stroke of the spindle 15, the conical surface 111 on the nut 108 engages the under side of the latch arm and swings the latter in a direction to release the valve member 75. As soon as the valve member 75 is released from the latch arm 106, the spring 103 closes the valve 73 or, in other words, moves the valve member 75 to the position shown in Figure 13 of the drawings. The piston 16, together with the spindle, is then retracted to withdraw the tool from the work and to again open the bypass 94. It will, of course, be noted that the yoke 110 moves rearwardly with the spindle to return the dash pot plunger 117 and adjustable latch releasing nut 108 to their inoperative positions shown in Figure 6 of the drawings. As the plunger 117 is retracted, the ball check valve 122 is opened against the action of the spring 123 and fluid in the chamber is replenished from the reservoir 116. During the above cycle, rotation of the drive shaft 29 and spindle 15 continues, so that the next cycle may be initiated by merely again closing the switch 99.

In conclusion, it is pointed out that the machine tool may also be used for tapping operations by merely mounting a tapping attachment on the spindle. When employing the machine for tapping operations, a spindle is selected which has torsional characteristics predetermined to enable limited twisting of the spindle in the event the tap should encounter abnormal resistance. In other words, some degree of flexibility is provided in the spindle, so that tap breakage is reduced to a minimum.

What we claim as our invention is:

1. A machine tool comprising a block frame having an opening extending longitudinally therethrough, one end portion of said opening constituting a cylinder and another portion forming a separate chamber, a hollow piston in said cylinder, a hollow crank shaft in said chamber, a hollow drive shaft adjacent to said crank shaft and extending out through the opposite end of said block, a rotary transmission between said drive shaft and crank shaft, a spindle coaxial with said hollow piston and shafts and extending within the same, said spindle having a splined engagement with said drive shaft and being connected to said piston to be axially fixed thereto but rotatively free, the outer end of said spindle adjacent to said piston forming a tool connection, an air compressor within said chamber actuated by said crank shaft, and valve controlled connections between said compressor and cylinder for actuating said piston alternatively in opposite directions.

2. A machine tool comprising a block frame having an opening extending longitudinally therethrough, one end portion of said opening constituting a cylinder and another portion forming a separate chamber, a hollow piston in said cylinder, a hollow crank shaft in said chamber, a hollow drive shaft adjacent to said crank shaft and extending out through the opposite end of said block, a rotary transmission between said drive shaft and crank shaft, a spindle coaxial with said hollow piston and shafts and extending within the same, said spindle having a splined engagement with said drive shaft and being connected to said piston to be axially fixed thereto but rotatively free, the outer end of said spindle adjacent to said piston forming a tool connection, an air compressor within said chamber actuated by said crank shaft, adjustable means for regulating the pressure of the compressed air, connections between said compressor and cylinder, a valve controlling said connections, actuating means for said valve biased to normally hold the same in position for retraction of said piston, latch means for temporarily holding the valve when shifted to a position for actuating the piston in an outward direction, and means adjustably connected to said piston for tripping said latch after a predetermined movement of said piston and spindle whereby the advancement of the tool is determined by the resilient pressure of the compressed air.

3. A machine tool comprising a block frame having an opening extending longitudinally therethrough, one end portion of said opening constituting a cylinder and another portion forming a separate chamber, a hollow piston in said cylinder, a hollow crank shaft in said chamber, a hollow drive shaft adjacent to said crank shaft and extending out through the opposite end of said block, a rotary transmission between said drive shaft and crank shaft, a spindle coaxial with said hollow piston and shafts and extending within the same, said spindle having a splined engagement with said drive shaft and being connected to said piston to be axially fixed thereto but rotatively free, the outer end of said spindle adjacent to said piston forming a tool connection, an air compressor within said chamber actuated by said crank shaft, adjustable means for regulating the pressure of the compressed air, connections between said compressor and cylinder, a valve controlling said connections, actuating means for said valve biased to normally hold the same in position for retraction of said piston, latch means for temporarily holding the valve when shifted to a position for actuating the piston in an outward direction, and means adjustably connected to said piston for tripping said latch after a predetermined movement of said piston and spindle whereby the advancement of the tool is determined by the resilient pressure of the compressed air, a dashpot for resisting advancement of the spindle and an adjustable connection between said piston and dashpot for operating the latter in only a final portion of the movement of the former.

4. A machine tool comprising a block frame having an opening extending longitudinally therethrough, one end portion of said opening constituting a cylinder and another portion forming a separate chamber, a hollow piston in said cylinder, a hollow crank shaft in said chamber, a hollow drive shaft adjacent to said crank shaft and extending out through the opposite end of said block, a rotary transmission between said drive shaft and crank shaft, a spindle coaxial with said hollow piston and shafts and extending within the same, said spindle having a splined engagement with said drive shaft and being connected to said piston to be axially fixed thereto but rotatively free, the outer end of said spindle adjacent to said piston forming a tool connection, an air compressor within said chamber including a pair of cylinders with their axes transverse to the axis of said spindle, pistons in said pair of cylinders, connections between the crank shaft and said pistons for reciprocating the latter oppositely to form a substantially continuous supply of compressed air, connections between said compressor and first mentioned cylinder, and a valve controlling said connections for alternatively admitting air to said cylinder on opposite sides of said piston.

5. A machine tool comprising a block frame having an opening extending longitudinally therethrough, one end portion of said opening constituting a cylinder and another portion forming a separate chamber, a hollow piston in said cylinder, a head separating said cylinder from said chamber and provided with a portion telescopically engaging said hollow piston, a hollow crank shaft in said chamber, a hollow rotary drive shaft adjacent to said crank shaft and extending outward therefrom, a step down transmission mechanism between said rotary drive shaft and crank shaft, a spindle coaxial with said hollow piston and shafts extending within the same, said spindle having a splined engagement with said drive shaft and being connected to said piston to be axially fixed thereto but rotatively free, the outer end of said spindle adjacent to said piston forming a tool connection, an air compressor within said chamber including a pair of cylinders with their axes transverse to the axis of said spindle, pistons in said pair of cylinders, connections between said crank shaft and pistons for reciprocating the latter simultaneously in opposite directions, connections between said compressor and first mentioned cylinder, a valve controlling said connections to admit air alternately on opposite sides of said piston, operating means for said valve biased to normally hold the same in position for retracting said piston, latch means for temporarily holding said valve when operated in position for advancing said piston under the resilient pressure of the compressed air, a rod movable with said piston, a member adjustable to different positions on said rod adapted to trip said latch after a predetermined movement of said piston and spindle, a hydraulic dashpot, and an adjustable connection between said spindle actuating piston and said dashpot to operate the latter in only a final position of the advance movement of said piston and spindle.

WILLIAM B. LOCKE.
PERCY E. FRASER.

(References on following page)

REFERENCES CITED

The following references are of record in the file of this patent:

UNITED STATES PATENTS

| Number | Name | Date |
|---|---|---|
| 810,686 | Taylor | Jan. 23, 1906 |
| 1,725,489 | Stratton | Aug. 20, 1929 |
| 1,998,873 | Kingsbury | Apr. 23, 1935 |
| 1,999,248 | Melling | Apr. 30, 1935 |
| 2,232,514 | Day | Feb. 18, 1941 |

FOREIGN PATENTS

| Number | Country | Date |
|---|---|---|
| 501,146 | Great Britain | Feb. 22, 1939 |